United States Patent [19] [11] 4,054,863
Goodman et al. [45] Oct. 18, 1977

[54] ERROR DETECTION AND CORRECTION SYSTEM

[75] Inventors: David Joel Goodman, Summit, N.J.; Raymond Steele, Long Whatton, England

[73] Assignee: Bell Telephone Laboratories, Incorporated, Murray Hill, N.J.

[21] Appl. No.: 745,831

[22] Filed: Nov. 29, 1976

[51] Int. Cl.² .................... G06F 11/00; G08C 25/00
[52] U.S. Cl. ............................. 340/146.1 R; 325/41
[58] Field of Search ......................... 340/146.1 R; 235/151.31; 325/41, 42, 323; 328/135, 149, 151, 162

[56] References Cited

U.S. PATENT DOCUMENTS

| | | | |
|---|---|---|---|
| 3,048,781 | 8/1962 | Glaser | 325/41 |
| 3,386,079 | 5/1968 | Wiggins | 340/146.1 R |
| 3,396,369 | 8/1968 | Brothman et al. | 340/146.1 R |
| 3,562,708 | 2/1971 | Verbarg et al. | 340/146.1 R |
| 3,568,147 | 3/1971 | Gilson | 340/146.1 R |
| 3,696,203 | 10/1972 | Leonard | 340/146.1 R |
| 3,927,309 | 12/1975 | Fujiwara et al. | 328/135 |

Primary Examiner—Charles E. Atkinson
Attorney, Agent, or Firm—J. S. Cubert; Joseph P. Kearns

[57] ABSTRACT

An error reducing arrangement is provided for a signal receiver wherein a sequence of received signals is divided into groups and each group is partitioned into subgroups. A signal representative of the deviations among the signals of each group and a signal representative of the deviations among the signals of each subgroup of said group are generated. Responsive to a subgroup deviation signal exceeding its group deviation signal, the subgroup signals are altered to reduce the subgroup deviations. In this manner errors are reduced without affecting error free signals.

13 Claims, 12 Drawing Figures

FIG. 6A $V_A(t)$ (IN VOLTS)

$V_A(t) = 2 \times 10^{+3} t$

FIG. 6B $Q_S(t)$ (IN QUANTUM UNITS)

FIG. 6C $Q_R(t)$ (IN QUANTUM UNITS)

$S_{n+1}$ ERRONEOUS DATA POINT $S_n$ $S_{n+2}$

FIG. 6D

ABSOLUTE VALUE OF SUCCESSIVE DIFFERENCES SIGNAL (IN QUANTUM UNITS)

FIG. 6E

SIGNAL APPLIED TO OUTPUT OF D-A CONVERTER 127 (IN QUANTUM UNITS)

CORRECTED DATA POINT

ERROR DETECTION AND CORRECTION SYSTEM

BACKGROUND OF THE INVENTION

1. Field of the Invention

This invention relates to error reduction in communications systems, and more particularly to receiver-based error reduction in systems having variable signal channel quality.

2. Description of the Prior Art

In the continuing search for more reliable communications systems, many different approaches have been tried. One very useful approach has been to make use of a process of sampling and quantizing, which converts continuous scales of time and amplitude, respectively, into discrete scales, permitting representation of the signal by a finite number of quantized coded symbols. As described in U.S. Pat. No. 2,681,385, issued to B. M. Oliver on June 15, 1954, sampling alone does not entail any loss of information if the sampling frequency is at least twice as great as the highest frequency of interest in the information signal. Furthermore, quantization does not cause a serious loss of information if the number of quantizing levels is sufficiently high.

The quantized coded signals are normally transmitted across an information channel, i.e., from transmitter to receiver, in binary coded form. Such a coded signal consists of a timewise serial train of pulses and spaces representing "high" (or "1") and "low" (or "0") states, respectively. Each pulse and space constitutes a "bit" of the binary code, and $n$ bits in time sequence constitutes an $n$ bit "word". Thus, for example, a "three-bit" binary coded signal consists of a sequence of "three-bit" words, each of which represents a quantum level of the sampled and quantized input analog signal.

An error in the state of one of the binary word bits can cause a very large error in the resulting output quantum level. For example, a transmission error in the leftmost bit of the transmitted binary word 1001 representing the decimal quantum value 9 would result in the word being received as the binary word 0001 representing the decimal quantum value 1. Single bit errors in received binary coded signals can thus cause serious distortion of the receiver output analog signal.

Much progress has been made in bit error detection and correction apparatus for quantized coded information transmission systems. The common approaches used include: (1) repetition of data techniques; (2) transmission over multiple channels; and (3) parity checking with error detecting codes. Each of these approaches requires additional equipment at both the transmitter and receiver. Examples of such systems are found in U.S. Pat. No. 3,444,516, issued to Joseph W. Lechleider on May 13, 1969, and U.S. Pat. No. 3,475,723, issued to Herbert O. Burton on Oct. 28, 1969.

Solely receiver-located error detection and correction is desirable, since it avoids the need for more complex transmitters. The article "Average and Median Based Smoothing Techniques for Improving Digital Speech Quality in the Presence of Transmission Errors," *IEEE Transactions on Communications*, Volume 24, pages 1043-1045, September, 1976, discloses receiver-located smoothing techniques for noise attenuation in signals from digital channels with relatively high error probability.

The article "Detection and Partial Correction of Isolated Errors from the Received Data in a 1st-Order D.P.C.M. CODEC," by R. Steele and M. A. Yeoman, *Electronics Letters*, Volume 11, No. 11, pages 230-232, May, 1975, discloses a slope-limited transmission and reception system which senses and partially modifies high divergent data points in a received signal based on its deviation from the known slope limitations of the transmitted signal. In this slope limited system, however, the analog signal must be sampled appreciably above the Nyquist rate. When a highly divergent data point is detected, the deviant sample is replaced by the value of the most recent preceding reconstructed sample which does not violate the slope limitations of the transmitted signal. The reconstructed samples constitute the output of a slope-limited differential pulse code modulator located in the receiver.

It is an object of the present invention to provide an improved arrangement for receiver-located error detection and correction wherein a received signal sampled at or above the Nyquist rate is selectively corrected by a smoothing filter only when apparent errors have been detected.

SUMMARY OF THE INVENTION

The invention is directed to an error detection and correction system located at the receiving end of an information channel. An error reducing circuit receives a sequence of signals and divides said sequence of signals into a plurality of groups and into a plurality of subgroups. A first signal representative of the deviations among the signals of each group is generated as well as a second signal representative of the deviations among the signals of each subgroup. A third signal corresponding to the difference between said second signal and said first signal is compared with a predetermined threshold signal. Responsive to said third signal exceeding said threshold signal, a corrector is introduced to alter the received signals so that said third signal becomes less than said threshold signal.

In one embodiment of the present invention, means are provided for measuring the correlation coefficients of both a large group of quantized sampled codes, e.g., 64, and a much smaller included subgroup, e.g., 8. These correlation coefficients are then compared. If the subgroup correlation coefficient is determined to be larger than a predetermined acceptable deviation from the correlation coefficient of the large group, a smoothing filter is temporarily introduced to change the subgroup codes to more closely match the correlation coefficient of the subgroup with the correlation coefficient of the large group which includes the subgroup.

In another embodiment of the present invention, the RMS value of the difference between successive received samples of a relatively large group of quantized sampled codes are measured. The differences between immediately successive group samples are then compared with the already determined RMS value for the group. If any of these individual differences are unacceptably divergent from the group RMS value, a smoothing filter is temporarily introduced to substitute a value for the divergent sample which is more closely matched to the group's RMS value.

In both embodiments, the quality of a high error content received signal is significantly improved while there is little or no degradation of a low error content received signal.

DETAILED DESCRIPTION

Figure 1:
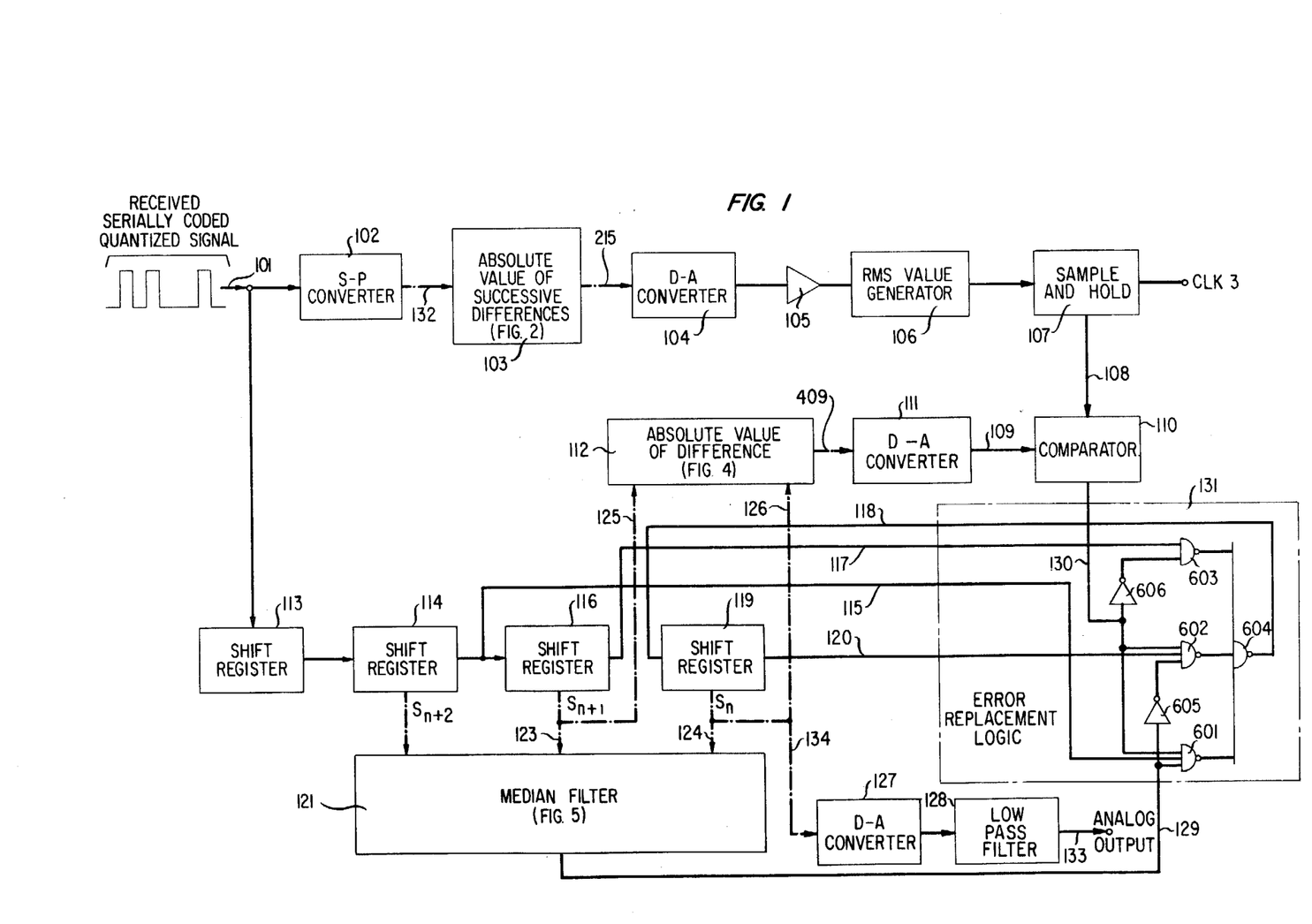
FIG. 1 shows an overall block diagram of an embodiment illustrative of the invention in which difference detection and correction is used.

FIG. 1 shows a block diagram of an error detection and correction system illustrative of the invention in which the RMS value of differences among a large group of coded signals is compared with the values of differences between immediately successive coded signals. A sequence of serial binary coded signals are applied from a transmission channel to lead 101 at a bit rate of 48 kilobits per second. Each coded signal constitutes a serial six-bit binary code so that the code or word rate is 8 kiloHertz. The serial coded signals from lead 101 are applied to both serial-to-parallel converter 102 and shift register 113. The parallel code output of serial-to-parallel converter 102 is clocked into absolute difference circuit 103. Circuit 103 generates a signal $\Delta X_n$, corresponding to the absolute value of the difference between successive pairs of codes, e.g., $X_n$, $X_{n+1}$, coming from serial to parallel converter 102 (i.e., $\Delta X_n = |X_n - X_{n+1}|$). Difference value signals $\Delta X_n$ are then applied to digital-to-analog converter 104 which transforms the $\Delta X_n$ codes into an analog difference signal. The analog output signal of digital-to-analog converter 104 is applied to the input of amplifier 105 which increases the analog signal by a factor L. The scaled analog difference signal from the output of amplifier 105 is applied to RMS value generator 106 which produces a signal, $V_{RMS}$, representative of the root mean square (RMS) value of the scaled analog differences, i.e., $$V_{RMS} = L(\frac{1}{K} \sum_{n=1}^{K} (\Delta X_n)^2)^{\frac{1}{2}}.$$

RMS generator 106 may be the AD531K multifunction converter module described in Analog Devices Corporation Technical Bulletin "IC Programmable Multiplier Divider Computation Circuit," pages 1-8, or any other similar devices well known in the art. The RMS value signal $V_{RMS}$ from generator 106 is supplied to a sample and hold circuit 107 wherein it is sampled once every 64 words responsive to the CLK3 clock signal.

The coded signal sequence on lead 101 is also applied to shift register 113 which acts as a 64-bit delay. The delayed coded signal output of shift register 113 is serially inserted into shift register 114. Shift register 114 acts as a serial-to-parallel converter and provides a sequence of parallel coded signals to median filter 121 via cable 122. Shift register 114 is also operative to delay each serial coded input signal by six bits and to supply the delayed serial coded signal to both line 115 and to the input of shift register 116 via line 135. Shift register 116 includes a serial-to-parallel converter and provides a parallel coded signal to median filter 121 via cable 123 responsive to each serial coded signal from register 114. Shift register 116 is also operative to delay the serial coded signals applied thereto by six bits and to transfer the delayed serial codes to line 117. The parallel output codes of shift register 116 are also transmitted via cable 125 to absolute differencing circuit 112. The signal on line 118 is applied to the input of shift register 119 via error replacement logic circuit 131. The parallel output of shift register 119 is transmitted via cable 124 to the median filter 121, via cable 134 to digital-to-analog converter 127, and via cable 126 to absolute differencing circuit 112. The signal from shift register 119 on line 134 constitutes the output digital signal of the system. This digital signal is transmitted to D-A inverter 127 and through low pass filter 128 to produce the analog output signal of the system on line 133.

Absolute differencing circuit 112 generates a signal representative of absolute value of the difference of the signals applied thereto from cables 126 and 125. The signal on cable 126 from shift register 119 represents the current digital output signal. The signal on cable 125 from shift register 116 constitutes the next succeeding received code word. The output of differencing circuit 112 is converted into an analog level by digital-to-analog converter 111. The output analog signal of digital-to-analog converter 111 is transmitted via line 109 to comparator 110, where it is compared with the scaled RMS value signal from sample and hold circuit 107 on line 108. Thus, the scaled RMS value of the absolute value of successive differences of a large block of input codes is compared on a sample-by-sample basis with the absolute value of the difference of the quantized current digital signal $S_n$ contained in shift register 119 and the next possible output digital signal $S_{n+1}$ contained in shift register 116. If the absolute value of the difference of the signals contained in these shift registers $|S_{n+1} - S_n|$ is larger than the RMS value of the absolute value of successive differences of the quantized signal taken over the large signal block, $S_{n+1}$ is considered erroneous and the comparator 110 sends an error signal P1 to the error replacement logic circuit 131.

Median filter 121 then picks the middle value of $S_n$ from register 114, $S_{n+1}$ from register 116, and $S_{n+2}$ from register 114 and transmits the selected middle value via the error replacement logic circuit to shift register 119 to replace the erroneous signal, $S_{n+1}$, with the selected middle signal $S_n$ or $S_{n+2}$ which is closer to the correct value. The output signal P1 of comparator 110, on line 130, is "high" (1) when the output signal of D-A converter 111 is higher than the scaled RMS signal on line 108. If the scaled RMS value signal on line 108 is larger than the output signal of D-A converter 111, the output P1 of comparator 110 is "low" (0). When signal P1 is low, there has been no error detected and the error replacement logic circuit 131 transmits the data $S_{n+1}$ from register 116 on line 117, via NAND gate 604, directly to line 118. The signal in shift register 119 is then replaced by the signal from shift register 116. When $S_{n+1}$ from register 116 is entered into register 119 via replacement logic 131, the system has not used the median filter and has passed the received signal $S_{n+1}$ to the output digital-to-analog converter 127.

Figure 5:
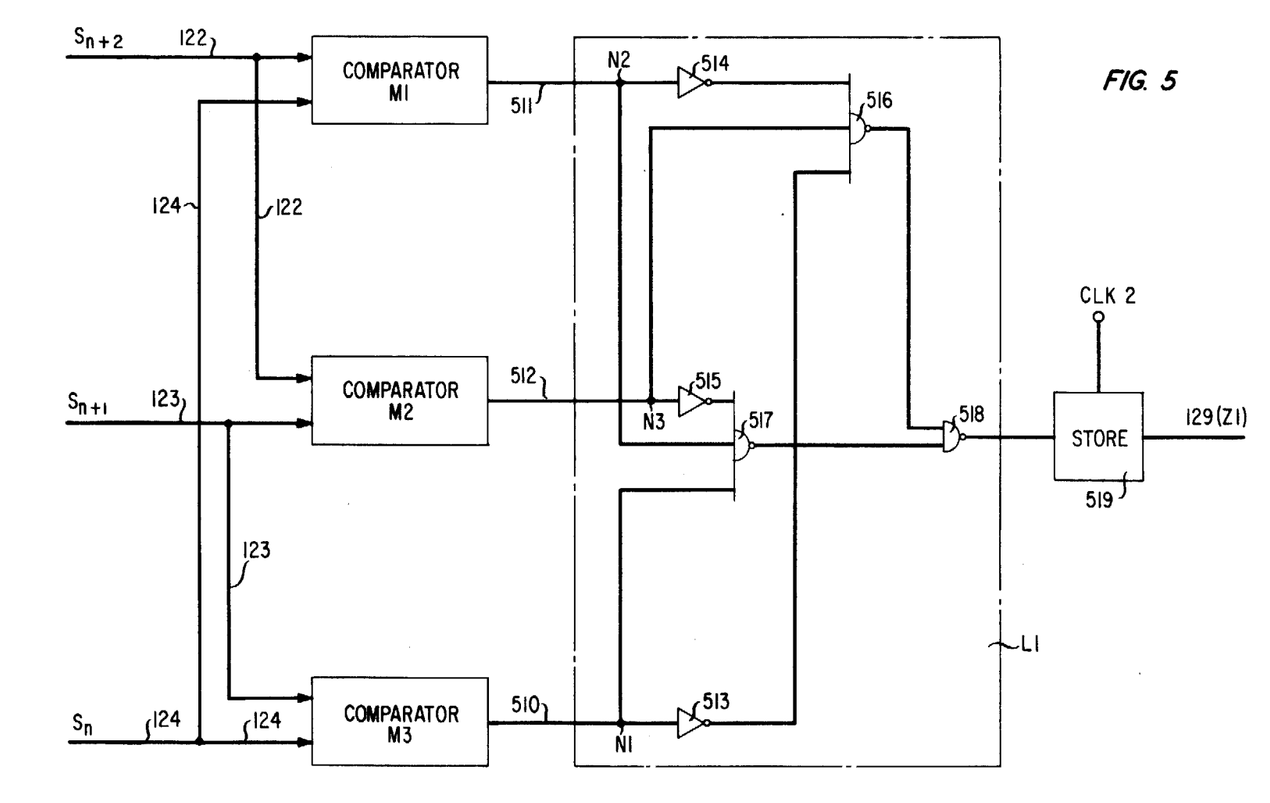
FIG. 5 shows a block diagram of the median filter 121 of FIG. 1.

If P1 from comparator 110 is high, indicating that the system has detected an error, the serial signal $S_{n+2}$ on line 115 from shift register 114, or the signal $S_n$ line 120 from shift register 119 is sent to line 118. In this manner, signal $S_{n+1}$ from register 116 is replaced by signal $S_{n+2}$ from register 114 or the signal $S_n$ is recirculated in shift register 119. The output Z1 of the median filter circuit 121 determines whether a replacement by $S_{n+2}$ or recirculation of $S_n$ will occur. When Z1 is high, the signal on line 115 in selected, thus replacing the previous signal $S_n$ in shift register 119 with the signal $S_{n+2}$ presently in shift register 114. If Z1 is low, the signal $S_n$ in shift register 119 is recirculated. In either case, when P1 is high, the signal $S_{n+1}$ in shift register 116, which has been determined by the system to contain an error, is discarded. Thus, when an error is detected in the signal in shift register 116, the next output word is selected from the signal in either shift register 119 or shift register 114. The replacement choice is based upon the median filter rule embodied in circuit 121 (FIG. 5).

Figure 3A:
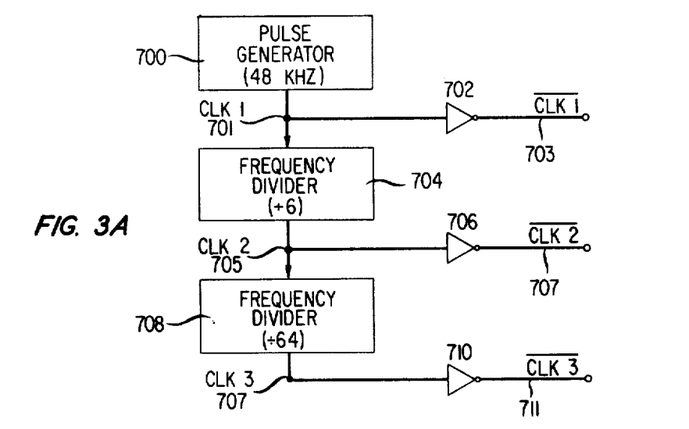
FIG. 3A shows the clock generator and countdown circuitry for producing the necessary timing pulses for the circuit of FIG. 1.
Figure 3B:
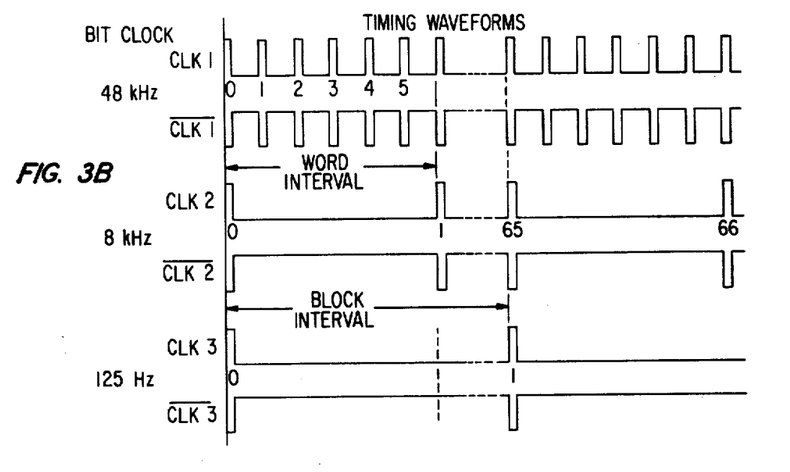
FIG. 3B shows the timing waveforms of the circuit of FIG. 3A.

FIG. 3A shows the pulse generator and frequency divider circuits for producing the necessary timing pulses for the system of FIG. 1. Circuit 700 is an astable multivibrator operating at a frequency of 48 kiloHertz. The output of multivibrator 700 on line 701 is CLK1. Inverter 702 produces $\overline{CLK1}$ on line 703. The CLK1 signal frequency is divided by six in frequency divider 704 which provides the CLK2 signal on line 705. The CLK2 signal is inverted by inverter 706 to provide the $\overline{CLK2}$ signal on line 707. The CLK2 signal frequency is divided by 64 in frequency divider 708, thus providing the CLK3 signal on line 709. CLK3 is inverted by inverter 710 to provide $\overline{CLK3}$ on line 711. CLK1 constitutes the bit clock, CLK2 is the word clock, and CLK3 represents the block clock. The relationship of these timing waveforms are illustrated in FIG. 3B.

Figure 2:
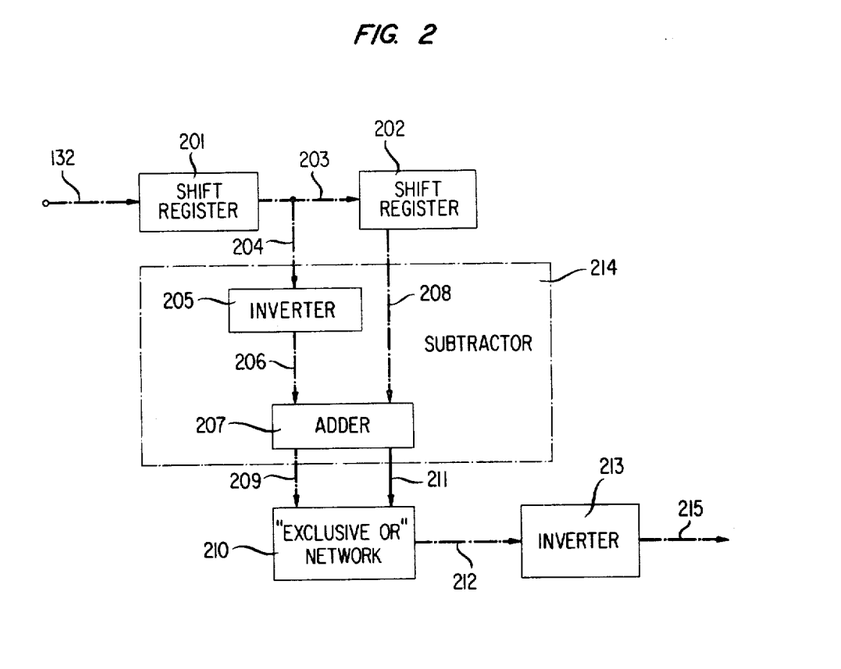
FIG. 2 shows a detailed diagram of "absolute value of successive differences" circuit 103 of FIG. 1.

FIG. 2 is a detailed diagram of the "absolute value of successive differences" circuit 103 of FIG. 1. FIG. 2 shows two shift registers 201 and 202 which contain the value of each of two successive received coded signal words. The words in register 202 are subtracted from the word in register 201 in subtraction circuit 214. The output of register 201 on line 203 is applied to the input of register 202. Register 201 receives the parallel output code of serial-to-parallel converter 102 via cable 132. The output of register 201 is transmitted by data cable 204 to inverter 205. The output of inverter 205 on line 206 is supplied to six-bit binary adder 207. The output of register 202 is sent via cable 208 to the other input of binary adder 207. The magnitude output of binary adder 207, on cable 209, is applied as one input to "exclusive OR" network 210. The other input of the "exclusive OR" network is the sign bit from binary adder 207 on line 211. The output of the "exclusive OR" network 310 is thus the inverted absolute value of the difference of the outputs of register 201 and register 202. Inverter 213 inverts the signal on cable 212 to provide a binary representation of the absolute value of the difference of the output signal values of registers 201 and 202. This difference signal appears on cable 215.

Figure 4:
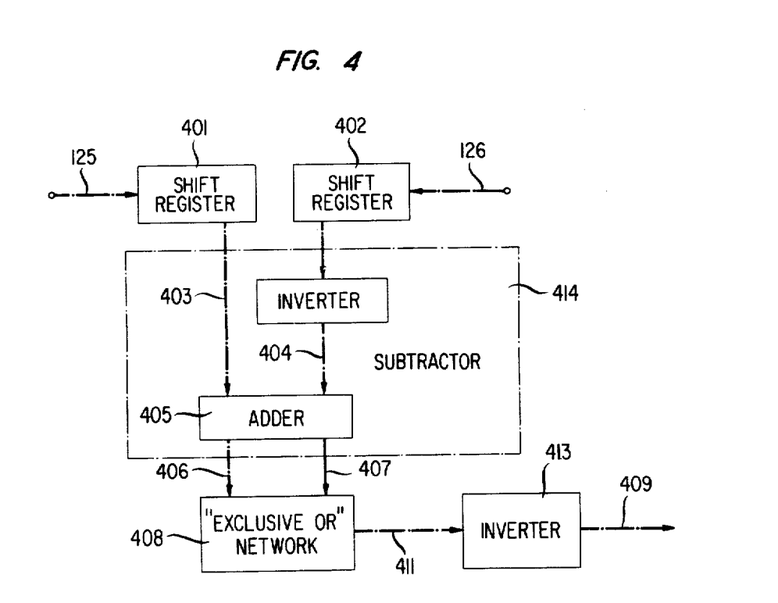
FIG. 4 shows a detailed diagram of absolute value of difference circuit 112 of FIG. 1.

FIG. 4 is also an absolute value of differences circuit whose operation is essentially the same as the circuit of FIG. 2 except that the input signals to shift registers 401 and 402 arrive simultaneously from different sources instead of arriving sequentially from the same source. The input to shift register 401 is on cable 125 coming from shift register 116, and the input to shift register 402 is on cable 126 coming from shift register 119. The output of shift register 401 on line 403 is added to the inverted output of shift register 402 on line 404 by adder 405. The magnitude of this sum on cable 406 and its sign bit on line 407 constitute the inputs to the "exclusive OR" network 408. The inverted output of the "exclusive OR" network on cable 409 is the absolute value of the difference of the input signals on lines 125 and 126.

FIG. 5 shows a diagram of a smoothing filter, which in this case is median filter 121. This median filter is operative to select the middle value of a group of three input values $S_{n+2}$, $S_{n+1}$, and $S_n$. There are three magnitude comparators in the median filter: M1, M2, and M3.

The inputs to magnitude comparator M1 are $S_n$ on cable 124 from register 119 and $S_{n+2}$ on cable 122 from register 114. Output N2 of comparator M1 on cable 511, is low (0) when the value of the signal $S_n$ on cable 124 is less than $S_{n+2}$ on cable 122, otherwise N2 is high (1). Inputs to magnitude comparator M2 are $S_{n+1}$ on cable 123 from register 116 and $S_{n+2}$ on cable 122 from register 114; and output N3 of magnitude comparator M2 on cable 512 is 0 when the signal value $S_{n+1}$ in shift register 116 on cable 123 is less than $S_{n+2}$ in shift register 114 on cable 122; otherwise N3 is 1. The inputs to magnitude comparator M3 are $S_n$ on cable 124 and $S_{n+1}$ on cable 123; and the N2 output of comparator M3 appears on cable 510. N1 is 0 when the signal value $S_n$ in shift register 119 is less than $S_{n+1}$ in shift register 116, otherwise N1 is 1. The N1, N2, and N3 of comparators M3, M1, and M2, respectively, are inputs to logic network L1 consisting of inverters 513, 514, and 515 and NAND gates 516, 517, and 518. Logic network L1 functions so that its output Z1 is 0 if N1 is 0, N2 is 1, and N3 is 1 or if N1 is 1, N2 is 0, and N3 is 1. Z1 is 1 if N1 and N2 are 0 and N3 is 1 or if N1 and N2 are 1 and N3 is 0. Comparators M1, M2, and M3 in conjunction with the logic network L1 operate to select the middle value of the three adjacent parallel signal words $S_{n+2}$, $S_{n+1}$, and $S_n$ contained in shift registers 114, 116, and 119, respectively. For example, if $S_{n+1} > S_n > S_{n+2}$, N1 equals 0, N2 equals 1, and N3 equals 1, and the output Z1 is 0. The output of logic network L1 from gate 518 is applied to storage register 519 which register provides word synchronization for the median filter network. The output Z1 of register 519 appears on line 129. If Z1 is 1 the error replacement logic circuit 131 causes the data $S_{n+2}$ in shift register 114 to replace the data $S_n$ in shift register 119. When Z1 is 0, the data $S_n$ in shift register 119 is recirculated. Thus a largely divergent quantized received signal $S_{n+1}$ is to be sensed as an error and is to be replaced by one of its immediately adjacent quantized signals which more nearly approximates the correct transmitted signal value.

The "error replacement logic" circuit 131 of FIG. 1 consists of inverters 605 and 606, and NAND gates 601, 602, 603, and 604. There are five inputs to the error replacement logic block, three of which, lines 115, 120, and 117, are serial data lines and two of which, lines 129 and 130, are control lines. The output of the error replacement logic circuit, line 118, is the serial data line that is connected to the input to shift register 119. One of the three data inputs $S_n$, $S_{n+1}$, and $S_{n+2}$ is selected by the combination of the two control inputs. One of $S_n$, $S_{n+1}$, and $S_{n+2}$ is sent to the shift register 119 according to Table I.

TABLE I

| P1 | Z1 | Output |
|----|----|--------|
| 0  | 0  | Data from line 117 |
| 0  | 1  | Data from line 117 |
| 1  | 0  | Data from line 120 |
| 1  | 1  | Data from line 115 |

For example, when P1 is 1, indicating an error, and Z1 is 0, indicating that the contents of shift register 119 should be recirculated, the error replacement logic circuit will transmit the signal $S_n$ on line 120 directly to the input of shift register 119 via line 118, and lines 115 and 117 will have no effect on shift register 119.

Figure 6A:
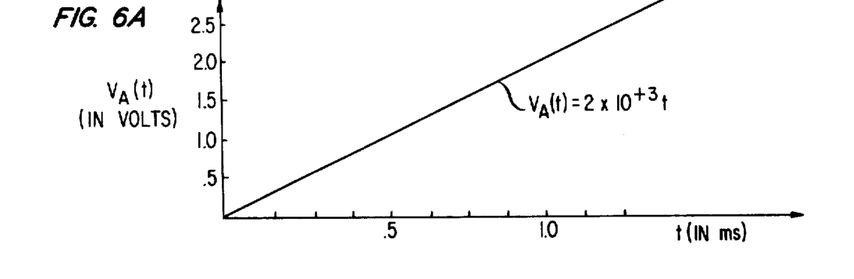
FIGS. 6A through E illustrate the effect of the difference detection and correction system on a received signal with an erroneous data point due to a transmission error.
Figure 6B:
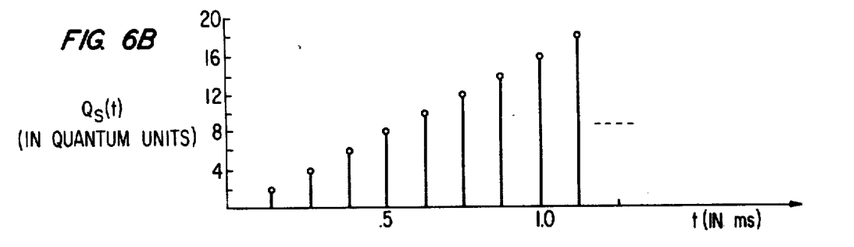
Figure 6C:
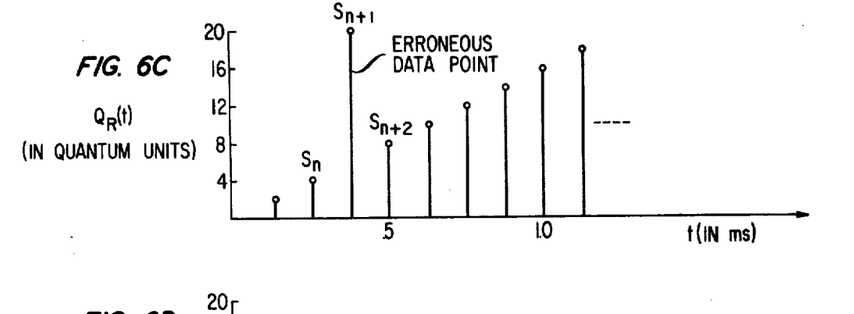
Figure 6D:
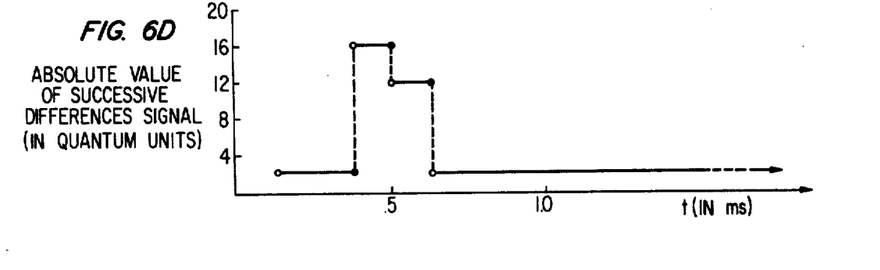
Figure 6E:
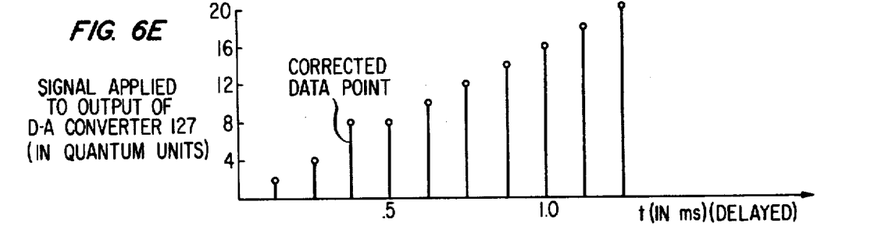

For purposes of illustration, consider the example depicted in FIGS. 6A through 6E. FIG. 6A shows an analog input signal corresponding to the ramp function $V_A(t) = 2 \times 10^3 \times t$. Signal $V_A(t)$ is sampled and quantized as indicated in FIG. 6B ($Qs(t)$) and transmitted in coded from. The received signal, $Q_R(t)$ corresponding to $V_A(t)$, contains an error $S_{n+1}$ as shown in FIG. 6C. When the quantized signal $Q_R(t)$ is applied to the system of FIG. 1, the erroneous data point will be detected and replaced by a value closer to the transmitted value.

The binary serially coded quantized signal applied at input lead 101 is converted to a parallel coded quantized signal by the serial-to-parallel converter 102. The signal is then transmitted via parallel data cable 132 to circuit 103 which generates the absolute value of the differences between the successive parallel data points as they are received. This output is converted to an analog signal by digital-to-analog converter 104 and is then scaled by a factor L by amplifier 105. RMS value generator circuit 106 then produces an output signal corresponding to the RMS value of the waveform shown in FIG. 6D calculated over a time interval of 8 milliseconds (i.e., the time for 64 coded words) and scaled by a factor of L. If, for this example, L is equal to 4, then the RMS value signal appearing at the output of circuit 106 will be slightly greater than 8 quantum units at the end of 64 coded words, i.e., 8 milliseconds. The RMS value signal is sampled at the end of each 64 words and this value is stored in sampled and hold circuit 107 for use in comparator 110.

Simultaneously, the binary serially coded quantized signal applied at input lead 101 is transmitted through shift registers 113, 114, 116, and 119. When the erroneous signal $S_{n+1}$ reaches register 116, its value is compared with the value of the immediately preceding signal $S_n$, which has already been placed in shift register 119. $S_{n+1}$ and $S_n$ are compared in comparator 112 which generates the absolute value of the difference of its two input signals. In this example, this difference, $|S_{n+1} - S_n|$, is 16 quantum units. This difference value is converted to an analog signal by digital-to-analog converter 111 and is transmitted to the other input of comparator 110. Comparator 110 compares the RMS value signal from sample and hold circuit 107 and the difference output from converter 111 and senses that the output of digital-to-analog converter 111 is larger than the scaled RMS value contained in sample and hold circuit 107. Accordingly, comparator 110 generates an "error" signal P1 = 1 on line 130.

The median filter 121 simultaneously determines that the middle value $S_{n+2}$ of the signals $S_n$, $S_{n+1}$, $S_{n+2}$ contained in shift registers 119, 116, and 114 respectively, is in shift register 114. Consequently the Z1 output of median filter 121 (1) is applied to error replacement logic circuit 131 via line 129. Responsive to control signals P1 = 1 and Z1 = 1, error replacement logic circuit 131 connects the output of shift register 114 to the input of shift register 119 via gates 603 and 604 so that the next output of shift register 119 will be $S_{n+1}$ from shift register 114. The effect of this operation illustrated in FIG. 6E in which the corrected signal value $S_{n+2}$ much closer to the true value of the transmitted signal replaces the erroneous data point $S_{n+1}$ of FIG. 6C. In accordance with the invention, error correction is performed only on signals having higher than expected deviations. Other signals are unaltered.

Figure 7:
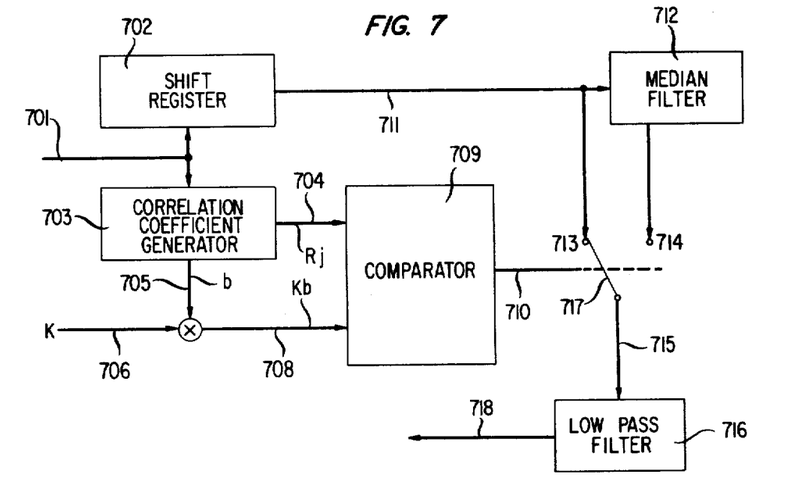
FIG. 7 shows a block diagram of another embodiment illustrative of the invention in which sliding block correlation error detection and correction is used.

FIG. 7 shows a block diagram of another embodiment illustrative of the invention which utilizes "sliding block correlation" error detection and correction. The quantized input data is applied to line 701 and is temporarily stored in shift register 702. This same data is also applied to the input to the correlation coefficient generator 703. The output correlation coefficients $b$ and $R_j$ of generator 703 are computed over data blocks of two different lengths. The coefficient $b$ is computed over a long block of samples, providing an estimate of the local correlation of the sample values $q(t)$ of that block as described by the "short term" autocorrelation equation:

$$b = \frac{1}{T_1} \int_{t-T_1}^{T_1} q(t) \, q(t - \tau) dt.$$

Coefficients $R_j$ constitute a sequence of "short term" autocorrelation coefficients computed for a plurality of shorter blocks contained within the above-mentioned long block i.e., $$R_j = \frac{1}{T_2} \int_{t-T_2}^{T_2} q(t) \, q(t - \tau) dt$$

where $T_2 < T_1$. Methods and means for generating these correlation coefficients are well known in the art, e.g., U.S. Pat. No. 2,854,191 issued to Gordon Raisbeck on Sept. 30, 1958. The coefficient $b$ is scaled by the factor K by multiplier 707. The resultant scale coefficient. K$b$, appearing on line 708, is compared in comparator 709 with each small block correlation coefficient $R_j$ contained within the large block over which coefficient $b$ was generated. Whenever one of the small block coefficients, $R_j$, is less than the quantity K$b$, comparator 709 produces an error signal which is applied via line 710 to switch control 717 to actuate the switch. Responsive to the error signal, line 715 is disconnected from line 713 and is connected to line 714 from the output of median filter 712. When line 715 is connected to line 714, the signal on line 715 is the output of the median filter rather than the delayed input signal from register 702. As described with respect to the circuit of FIG. 1, the output of the median filter is the value of the sample which is the median of the "error sample" and its two adjacent samples. This median filter output signal is applied to low pass filter 716 via line 715 to be substituted for the erroneous signal. The analog signal from filter 716 on line 718 constitutes the corrected output signal. If the next value of $R_j$ is not less than the quantity K$b$, the comparator will send a "no error" signal to the switch control 717, thus causing the switch to return to its normal position connecting line 713 to line 715. Switch control 717 remains in its normal position until another error signal is generated by the comparator. The error threshold level is controlled by the signal K.

An increase in K will cause the system to be more sensitive to sudden deviations in the input signal. Thus, the system can be adjusted for the desired error sensitivity, depending on the expected nature of the input signal as well as the quality of the transmission channel.

While the invention has been explained and described with reference to preferred embodiments thereof, numerous modifications thereof will be readily apparent to those skilled in the art without departing from the spirit and scope of the invention.

What is claimed is:

1. An error reducing circuit comprising means for receiving an input signal, means for dividing said signal into a plurality of segments, means for partitioning each signal segment into subsegments, means responsive to each signal segment for generating a first signal representative of the deviations of said input signal within said signal segment, means responsive to each signal subsegment of said signal segment for generating a second signal representative of the deviations of said input signal within said subsegment, means for generating a third signal for each subsegment corresponding to the difference between said subsegment second signal and said segment first signal, means for generating a predetermined threshold signal, and means responsive to said difference signal exceeding said threshold signal for forming a predetermined alteration of said subsegment signal.

2. An error reducing circuit according to claim 1 wherein said means for forming said predetermined alteration of said subsegment signal comprises means for replacing said subsegment signal with one of its adjacent subsegment signals.

3. An error reducing circuit according to claim 1 wherein said first signal generating means comprises means responsive to each signal segment for generating a signal representative of the RMS value of differences between successive samples of said input signal within said segment, said second signal generating means comprises means responsive to each signal subsegment within said segment for generating a signal representative of the difference between adjacent successive samples of said input signal in said subsegment, and said signal forming means comprises means for substituting an adjacent signal subsegment for said subsegment for which said third signal exceeds said threshold signal.

4. An error reducing circuit according to claim 1 wherein
said first signal generating means comprises means for generating a signal representative of the correlation of samples of said input signal within each signal segment,
said second signal generating means comprises means for generating a signal representative of the correlation of successive samples of said input signal in said subsegment, and said signal forming means comprises means for substituting an adjacent signal subsegment for each of said subsegments for which said third signal exceeds said threshold signal.

5. An error reducing circuit comprising means for receiving a sequence of signals, means for dividing said sequence of signals into a plurality of groups, means for dividing each group of signals into a plurality of subgroups, means responsive to the signals of each group for generating a first signal representative of the deviations among the signals of said group, means responsive to the signal of each subgroup for generating a second signal representative of the deviations among the signals of said subgroup, means for generating a third signal for each subgroup corresponding to the difference of the magnitude of the second signal of said subgroup and the magnitude of the first signal of the group including said subgroup, means for producing a predetermined threshold signal, and correcting means jointly responsive to said third signal and said threshold signal for forming a predetermined alteration of said subgroup signals.

6. An error reducing circuit according to claim 5 wherein said first signal generating means comprises means for generating the root mean square value of a sequence of successive differences taken among adjacent signals for each of said groups;
said second signal constitutes a sequence of differences taken among the adjacent signals of each subgroup; and
said correcting means comprises a smoothing filter which is applied to said subgroup signals when the value of said third signal exceeds that of said threshold signal.

7. An error reducing circuit according to claim 5 wherein:
said first signal corresponds to the correlation among the signals of said group;
said second signal corresponds to the correlation among the signals of said subgroup; and
said correcting means constitutes a smoothing filter which is applied to said subgroup signals when said second signal value exceeds that of said first signal.

8. An error reducing circuit comprising means for receiving a sequence of signal codes, means for dividing said sequence of signal codes into a plurality of groups, means for dividing each group of signal codes into a plurality of subgroups, means responsive to the signal codes of each group for generating a first signal representative of the deviations among the signal codes of said group, means responsive to the signal codes of each subgroup for generating a second signal representative of the deviations among the signal codes of said subgroup, means for generating a third signal for each subgroup corresponding to the difference between the second signal of said subgroup and the first signal of the group including said subgroup, means for producing a predetermined threshold signal, and correcting means responsive to said third signal being greater than said threshold signal for replacing the corresponding subgroup signal codes with one of its adjacent subgroup signal codes.

9. An error detection and correction apparatus for use with quantized information receivers which comprises:
means for receiving a series of quantized signals;
means for partitioning said series of quantized signals into a sequence of signal blocks;
means for generating a first signal representative of the successive difference of adjacent quantized signals;
means for generating a second signal representative of the root mean square value of said sucessive differences of said adjacent quantized signals over each signal block;
means for scaling said root mean square value signal;
means for comparing each of said successive differences of adjacent quantized signals of one of said signal blocks with said scaled root mean square value corresponding to said one of said signal blocks; and
means for replacing one of said quantized signals with one of its adjacent quantized signals whenever one of said first signals exceeds said second signal for one of said signal blocks, whereby the adjacent quantized signal chosen corresponds to the middle value of said one quantized signal and its two adjacent quantized signals.

10. An error detection and correction apparatus for use with quantized information receivers which comprises:
   means for receiving a series of quantized signals;
   means for partitioning said series of quantized signals into a sequence of signal blocks;
   means for partitioning said signal blocks into a plurality of subblocks;
   means for generating a block correlation signal corresponding to the correlation of said quantized signals within each of said signal blocks;
   means for producing a scaled block correlation signal;
   means for generating a subblock correlation signal corresponding to the correlation of said quantized signals within each of said subblocks;
   means for comparing each of said subblock correlation signals with its corresponding block correlation signal; and
   means for altering said quantized signals within said subblocks whenever said subblock correlation signal is less than said corresponding scaled block correlation signal, whereby said alteration causes said quantized signals within said subblock to be replaced by the quantized signals within an adjacent subblock of said block.

11. A method for reducing the error content of a received sequence of signals which comprises:
   dividing said sequence of signals into a plurality of groups;
   partitioning each of said groups into subgroups;
   generating a first signal for each group representative of the deviations among the signals of said group;
   multiplying said first signals by a constant to produce a threshold signal for each group;
   generating a second signal for each subgroup representative of the deviations among the signals in said subgroups;
   generating a third signal for each subgroup corresponding to the difference of said second signal of said subgroup and said first signal of the group including said subgroup; and
   selectively altering said subgroup signals responsive to said third signal exceeding said threshold signal to produce a second signal which is closer in value to said first signal.

12. A method for reducing the error content of a received sequence of signals according to claim 11, wherein:
   said first signal constitutes the root mean square value of the successive differences of the adjacent signals taken over each of said groups of signals;
   said second signal corresponds to the absolute value of the difference of each pair of adjacent signals in said received sequence of signals; and
   said selective alteration includes selectively smoothing said subgroup signals by selecting a signal adjacent to the signal causing said third signal to exceed said threshold signal.

13. A method for reducing the error content of a received sequence of signals according to claim 11, wherein:
   said first signal corresponds to the correlation among the signals of said group;
   said second signal corresponds to the correlation among said subgroup signals; and
   said selective alteration includes selectively replacing subgroup causing said third signal to exceed said threshold signal with one of its two adjacent subgroups.

* * * * *